United States Patent
Smee et al.

(10) Patent No.: US 8,400,979 B2
(45) Date of Patent: Mar. 19, 2013

(54) FORWARD LINK HANDOFF FOR WIRELESS COMMUNICATION SYSTEMS WITH OFDM FORWARD LINK AND CDMA REVERSE LINK

(75) Inventors: John E. Smee, San Diego, CA (US); Jay Rodney Walton, Carlisle, MA (US); Durga P. Malladi, San Diego, CA (US); Serge Willenegger, Onnens (CH)

(73) Assignee: Qualcomm Incorporated, San Diego, CA (US)

( * ) Notice: Subject to any disclaimer, the term of this patent is extended or adjusted under 35 U.S.C. 154(b) by 1292 days.

(21) Appl. No.: 10/744,373

(22) Filed: Dec. 22, 2003

(65) Prior Publication Data

US 2005/0083888 A1 Apr. 21, 2005

Related U.S. Application Data

(60) Provisional application No. 60/438,666, filed on Jan. 7, 2003.

(51) Int. Cl.
*H04W 4/00* (2009.01)
(52) U.S. Cl. ........................................ 370/331
(58) Field of Classification Search .................. 370/331, 370/332, 334; 455/436–444
See application file for complete search history.

(56) References Cited

U.S. PATENT DOCUMENTS

| | | | | |
|---|---|---|---|---|
| 5,790,528 A * | 8/1998 | Muszynski | .................... | 370/331 |
| 6,038,450 A * | 3/2000 | Brink et al. | .................... | 455/442 |
| 6,252,861 B1 * | 6/2001 | Bernstein et al. | .................... | 370/331 |
| 6,671,265 B1 * | 12/2003 | Hwang et al. | .................... | 370/331 |
| 6,681,112 B1 * | 1/2004 | Schwarz et al. | .................... | 455/436 |
| 6,907,243 B1 * | 6/2005 | Patel | .................... | 455/442 |
| 7,280,467 B2 | 10/2007 | Smee et al. | | |
| 2001/0051524 A1 * | 12/2001 | Hunzinger | .................... | 455/442 |
| 2002/0002058 A1 * | 1/2002 | Hamabe | .................... | 455/522 |
| 2002/0048266 A1 * | 4/2002 | Choi et al. | .................... | 370/331 |
| 2002/0051432 A1 * | 5/2002 | Shin | .................... | 370/331 |
| 2002/0054585 A1 * | 5/2002 | Hanada et al. | .................... | 370/342 |
| 2002/0141360 A1 * | 10/2002 | Baba et al. | .................... | 370/331 |

(Continued)

FOREIGN PATENT DOCUMENTS

| | | |
|---|---|---|
| EP | 1081974 | 3/2001 |
| EP | 1113694 A1 | 7/2001 |

(Continued)

OTHER PUBLICATIONS

International Search Report—PCT/US2004/000324, International Search Authority—European Patent Office—Oct. 19, 2004.

(Continued)

*Primary Examiner* — Jeffrey M Rutkowski
*Assistant Examiner* — Juvena Loo
(74) *Attorney, Agent, or Firm* — Qualcomm Patent Group; Thien T. Nguyen; James H. Yancey, Jr.

(57) ABSTRACT

A method and apparatus for performing handoff in a wireless communication system with multi-carrier modulation (MCM) for a forward link and CDMA for a reverse link. In one embodiment, a method of performing handoff on the forward link for a terminal is provided in which signal quality of pilots received by the terminal from a plurality of base stations in the system is determined. A particular base station for subsequent data transmission on the forward link to the terminal is selected based on the signal quality determined for the plurality of base stations. A request to be handed off to the particular base station is initiated if the particular base station is different than a currently selected base station.

30 Claims, 4 Drawing Sheets

U.S. PATENT DOCUMENTS

| | | | |
|---|---|---|---|
| 2002/0159422 A1* | 10/2002 | Li et al. | 370/342 |
| 2002/0187801 A1* | 12/2002 | Vanghi | 455/522 |
| 2002/0198000 A1 | 12/2002 | Voyer | |
| 2003/0092456 A1* | 5/2003 | Dent | 455/503 |
| 2003/0153311 A1* | 8/2003 | Black | 455/436 |
| 2004/0053615 A1* | 3/2004 | Kim et al. | 455/436 |

FOREIGN PATENT DOCUMENTS

| | | |
|---|---|---|
| JP | 64055924 | 3/1989 |
| JP | 1321739 A | 12/1989 |
| JP | 6164477 A | 6/1994 |
| JP | 09252481 | 9/1997 |
| JP | 1094020 | 4/1998 |
| JP | 2001112041 | 4/2001 |
| JP | 2001197536 A | 7/2001 |
| JP | 2002300628 | 10/2002 |
| WO | WO0118991 | 3/2001 |
| WO | WO02073831 A1 | 9/2002 |

OTHER PUBLICATIONS

Written Opinion—PCT/US2004/000324, International Search Authority—European Patent Office—Oct. 19, 2004.

International Preliminary Report on Patentability—PCT/US2004/000324, International Search Authority—IPEA/US—Alexandria, Virginia—Jun. 5, 2008.

* cited by examiner

FORWARD LINK HANDOFF FOR WIRELESS COMMUNICATION SYSTEMS WITH OFDM FORWARD LINK AND CDMA REVERSE LINK

CLAIM OF PRIORITY UNDER 35 U.S.C. §119

The present Application for Patent claims priority to Provisional Application No. 60/438,666 entitled, "Forward Link Handoff for Wireless Communication Systems Using OFDM Forward Link and CDMA Reverse Link," filed Jan. 7, 2003.

BACKGROUND

I. Field

The present invention relates generally to data communication, and more specifically to techniques for performing handoff on the forward link in wireless communication systems that use multi-carrier modulation (e.g., OFDM) for the forward link and CDMA for the reverse link.

II. Background

Wireless communication systems are widely deployed to provide various types of communication such as voice, packet data, and so on. These systems may be multiple-access systems capable of supporting communication with multiple users by sharing the available system resources. Such systems may be based on code division multiple access (CDMA), time division multiple access (TDMA), frequency division multiple access (FDMA), some other multiple access technique, or a combination thereof. CDMA systems may also be designed to implement known CDMA standards such as cdma2000, IS-856, IS-95, W-CDMA, and others.

In a direct sequence (DS) CDMA system, a narrowband signal is spread over the entire system bandwidth in the time domain with a spreading sequence. Some examples of such DS-CDMA systems include those that implement IS-2000, IS-95, and W-CDMA standards. The spreading sequence may be a pseudo-random number (PN) sequence (e.g., for IS-95 and IS-2000) or a scrambling sequence (e.g., for W-CDMA). A DS-CDMA system provides certain advantages such as ease of supporting multiple access, narrow-band rejection, and so on.

Orthogonal frequency division multiplexing (OFDM) effectively partitions the system bandwidth into a number of (N) orthogonal subbands, which are also often referred to as tones, frequency bins, and frequency subchannels. In each time interval that is dependent on the bandwidth of each subband, a modulation symbol may be transmitted on each of the N subbands. OFDM may be used to combat inter-symbol interference (ISI), which is a phenomenon whereby each symbol in a received signal acts as distortion to subsequent symbols in the received signal. ISI is caused by frequency selective fading in a multipath channel. To combat ISI, a portion of each OFDM symbol is repeated prior to transmission, as is known in the art.

For various reasons, it may be advantageous to use one modulation technique for one communication link (e.g., OFDM for the forward link) and another modulation technique for the complementary communication link (e.g., CDMA for the reverse link). However, the use of different modulation techniques may complicate certain system operation, such as handoff of terminals between base stations in the systems.

There is therefore a need in the art for techniques to perform handoff on the forward link in hybrid wireless communication systems.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
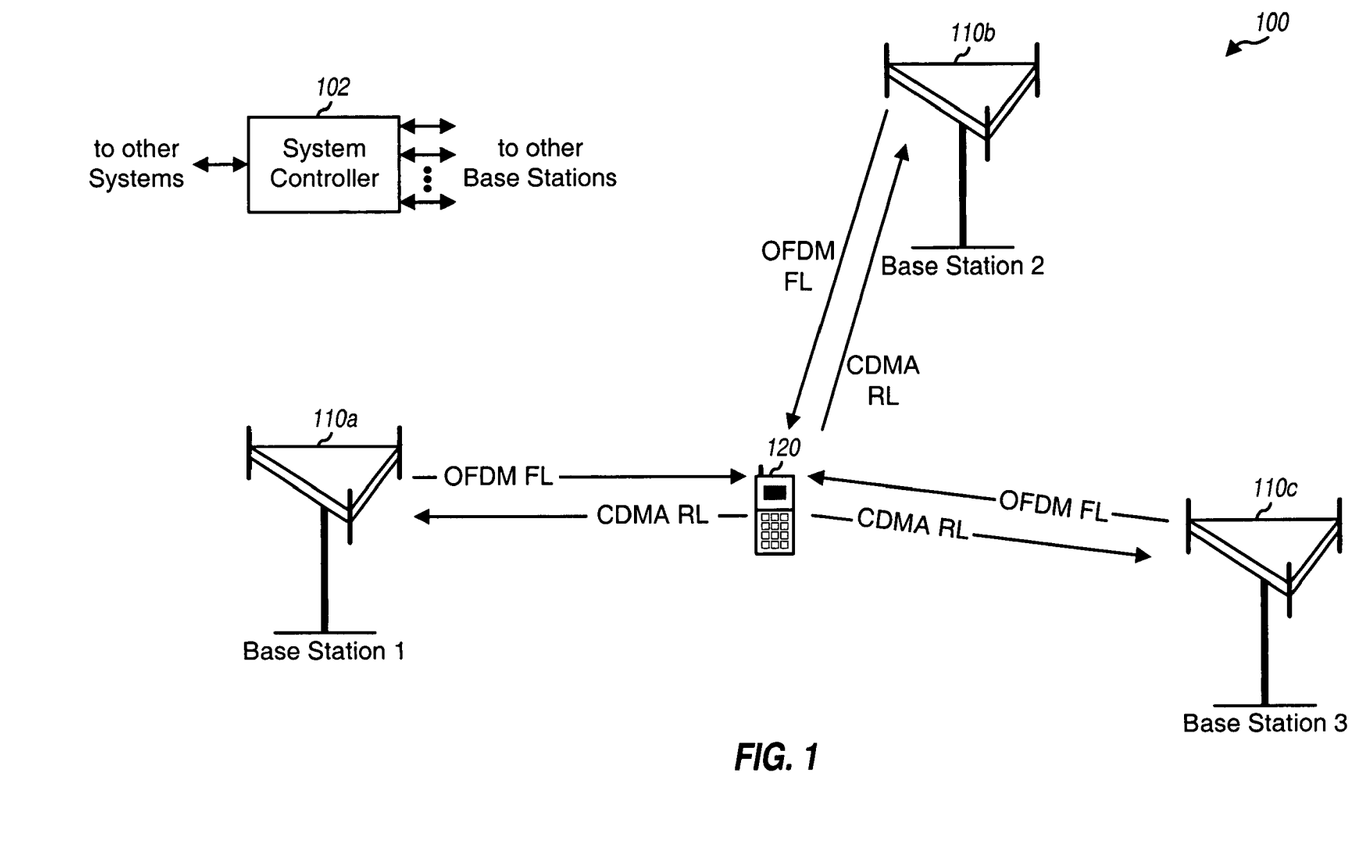
FIG. 1 is a wireless communication system.

FIG. 1 shows a wireless communication system 100 that may implement the forward link handoff techniques described herein. System 100 includes a number of base stations, each of which provides coverage for a respective geographic area. For simplicity, only three base stations 110a, 110b, and 110c are shown in FIG. 1. A base station may also be referred to as an access point, a Node B, or some other terminology. A base station and/or its coverage area are also often referred to as a cell, depending on the context in which the term is used. To increase capacity, the coverage area of each base station may be partitioned into multiple sectors. Each sector is then served by a corresponding base transceiver subsystem (BTS). For a sectorized cell, the base station for that cell may include all of the BTSs serving the sectors of that cell. For simplicity, the following description assumes that each cell is partitioned into three sectors that are served by three BTSs located within the base station, which in turn is located in the center of the cell.

Various terminals are typically dispersed throughout the system. For simplicity, only one terminal 120 is shown in FIG. 1. A terminal may also be referred to as a remote station, a mobile station, an access terminal, a user equipment (UE), a wireless communication device, or some other terminology. Each terminal may communicate with one or more BTSs on the forward link and one or more BTSs on the reverse link at any given moment. This depends on whether or not the terminal is active, whether or not soft handoff is supported for data transmission, and whether or not the terminal is in soft handoff. The forward link (i.e., downlink) refers to the communication link from the BTS to the terminal, and the reverse link (i.e., uplink) refers to the communication link from the terminal to the BTS.

A system controller 102 couples to base stations 110 and may further couple to other systems such as, for example, a public switched telephone network (PSTN), a packet data network (PDN), and so on. System controller 102 may also be referred to as a base station controller (BSC), a radio network controller (RNC), or some other terminology. System controller 102 provides coordination and control for the base stations coupled to it. System controller 102 further controls, via the base stations, the routing of calls (1) among the terminals in system 100 and (2) between the terminals in system 100 and other users coupled to other systems (e.g., the PSTN).

System 100 may be designed to utilize multi-carrier modulation (MCM) for the forward link (FL) and CDMA for the reverse link (RL). The multi-carrier modulation may be orthogonal frequency division multiplexing (OFDM) or some other modulation technique or construct. OFDM may provide certain advantages such as, for example, high data transmission capacity and ability to combat inter-symbol interference (ISI). For clarity, the following description assumes that system 100 utilizes OFDM on the forward link and CDMA on the reverse link.

To simplify the system design and to improve the overall system throughput, system 100 may be designed to support soft handoff (SHO) on the reverse link but not the forward link. Soft handoff on the forward link is achieved by redundantly transmitting data from multiple BTSs to a terminal to increase reliability for the data transmission. However, the redundant forward link transmission also reduces system capacity.

Soft handoff on the reverse link is achieved by having multiple BTSs in the same or different cells receive and process the reverse link signal from the terminal. If the multiple BTSs are for sectors in the same cell, then the reverse link signals received by these BTSs from the terminal may be combined prior to decoding (a process often referred to as "softer handoff"). If the multiple BTSs are for sectors in different cells, then each BTS may independently process and decode the received signal from the terminal, and the system may then select the decoded data from one of these BTSs. In any case, soft handoff on the reverse link can improve reliability for the reverse link transmission and may further increase the overall system capacity at the expense of more signal processing by multiple BTSs. Some examples of CDMA systems that do not employ soft handoff on the forward link for data users include (1) IS-856 systems, which are also referred to as 1xEV-DO systems, (2) IS-2000 systems, which are also referred to as 1xEV-DV systems, and (3) W-CDMA systems.

Each BTS transmits data on the forward link to the terminals within its sector. Each BTS further transmits pilot on the forward link, which may be received and identified by terminals located within and outside the sector. If soft handoff is not employed for the forward link, then each active terminal receives user-specific data transmission from only one BTS at any given moment, which is often referred to as the serving sector. A hard handoff (or simply, a handoff) occurs on the forward link whenever the serving sector for a terminal changes.

1. Forward Link Pilots

Each BTS transmits a pilot on the OFDM forward link (or simply, an "OFDM pilot") that may be used by the terminals for various functions such as channel estimation, timing and frequency acquisition, coherent data demodulation, received signal strength measurements, and so on. The OFDM pilots may be transmitted by the BTSs in a manner to improve their detection by the terminals in the system.

Each BTS may be configured to transmit its pilot on a specific set of subbands. Neighboring BTSs may be assigned different disjoint sets of subbands so that their pilots are orthogonal to one another in the frequency domain. The pilot for each BTS may further be covered with a specific orthogonal code assigned to the BTS. Nearby BTSs (e.g., those assigned with the same set of subbands) may be assigned different orthogonal codes so that their pilots are orthogonal to one another in the time domain. The orthogonalization of the pilots in the frequency domain and/or the time domain improve the detection and acquisition of these pilots by the terminals in the system.

The OFDM pilot for each BTS may further be scrambled with a specific scrambling code assigned to the BTS. The scrambling code randomizes the pilot interference and further allows the terminals in the system to uniquely identify the BTSs based on the received pilots.

Various pilot transmission schemes that may be used for the OFDM forward link are described in U.S. patent application Ser. No. 10/359,811, entitled "Pilot Transmission Schemes For Wireless Multi-Carrier Communication Systems", filed Feb. 7, 2003, assigned to the assignee of the present invention, and incorporated herein by reference.

2. Terminal Initiated Forward Link Handoff

A terminal in the system may continually or periodically monitor the forward link transmissions from the BTSs in the system to determine which BTS to select as the serving sector. In an embodiment, the selection for the serving sector is made based on measurements of the power of the pilots received from the BTSs. In general, the serving sector selection may be made based on any measure of signal quality for the BTSs such as, for example, signal-to-noise ratios (SNRs).

Figure 2:
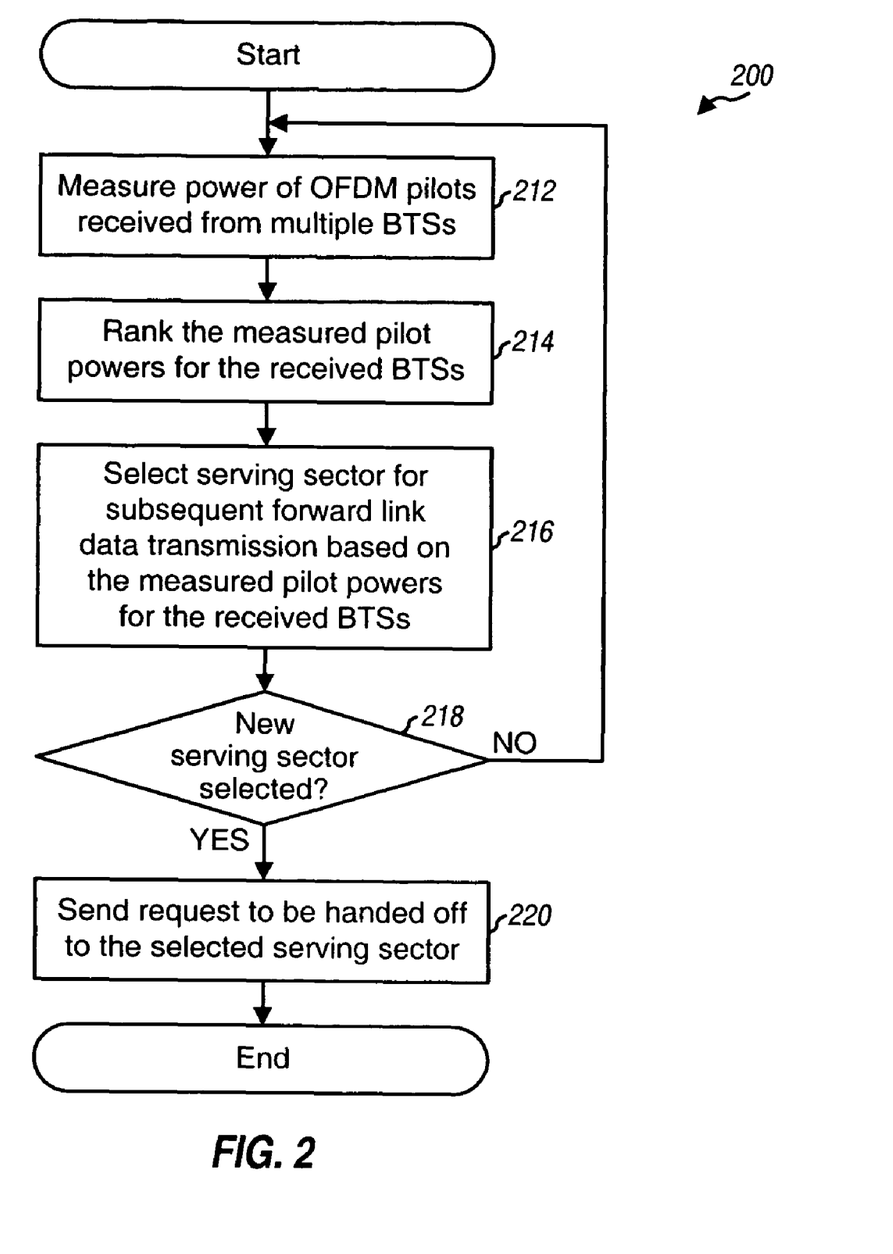
FIG. 2 is a flow diagram of an embodiment of a process for performing terminal-initiated forward link handoff.

FIG. 2 shows a flow diagram of an embodiment of a process 200 for performing terminal-initiated forward link handoff. Process 200 may be performed by a terminal.

Initially, the terminal measures the power of the OFDM pilots received from multiple BTSs (step 212). The terminal has knowledge of pertinent information needed to receive and process the OFDM pilots from the BTSs for different sectors. This information is dependent on the particular pilot transmission scheme implemented by the system. For the pilot transmission schemes described in the aforementioned U.S. patent application Ser. No. 10/359,811, this information may include, for example, the set of subbands used by each BTS for pilot transmission, the orthogonal code (e.g., Walsh code) used by each BTS to cover its pilot prior to transmission, and the scrambling code used by each BTS to scramble it pilot for BTS identification and randomization. The pilot processing by the terminal may be performed as described in the aforementioned U.S. patent application Ser. No. 10/359,811. The outputs of the pilot processing are measured pilot powers for the BTSs received by the terminal. The measured pilot powers for the received BTSs are then ranked (e.g., in descending order) (step 214).

As a specific example, if the system has 512 subbands for the OFDM forward link, approximately ten percent of these subbands (e.g., 50 subbands, with indices of 10, 20, 30, . . . 500) may be used as pilot subbands. The terminal can measure the power of the pilot received on each of these pilot subbands and further average the pilot power across these 50 pilot subbands to obtain the measured pilot power for the BTS. In general, any function of the received pilot powers or SNRs for the pilot subbands may be used for the selection of the serving sector.

A serving sector is then selected for subsequent forward link data transmission to the terminal (step 216). The serving sector selection is made based on (1) the measured pilot powers for the received BTSs and (2) a particular selection algorithm. The algorithm may use hysteresis in the selection process to avoid ping-ponging between two serving sectors (i.e., frequently requesting a switch between two sectors that are received by the terminal with similar pilot powers or SNRs). The hysteresis may be implemented using different switching levels, with a timer, or by some other mechanism. For example, the terminal may request handoff to another serving sector only if the measured pilot power for this sector exceeds the measured pilot power for the current serving sector by a particular amount.

A determination is then made whether or not the newly selected serving sector is the same as the current serving sector (step 218). If the selected serving sector is the same as the current one, then the process returns to step 212. Otherwise, the terminal sends a request to be handed off to the selected serving sector, which is received stronger than the current serving sector (step 220). In addition to the handoff request, the terminal may also send other pertinent information such as, for example, the maximum data rate that the terminal expects it can successfully demodulate.

Upon receiving the handoff request from the terminal, the system may grant or deny the request. This decision may be made based on various factors, as described below. If the handoff request is granted, then the grant may be signaled to the terminal and the new serving sector thereafter transmits data on the forward link to the terminal. Otherwise, the terminal may continue to receive forward link data transmission from the current serving sector.

Various factors/criteria may be considered in deciding whether to grant or deny the handoff request from the terminal. The best choice for the serving sector for the terminal may not necessarily be the sector that the terminal is receiving the OFDM pilot with the highest power or SNR. Other factors that may also be considered includes the loading of the sector, the reverse link measurements made by the BTSs for the terminal, the priority of the terminal, the service currently obtained by the terminal, and so on. For example, a sector with a lightly loaded forward link may be a better choice than a sector with a heavily loaded forward link, especially if the difference in the measured pilot powers or SNRs for the two sectors is small. The BTS for the current serving sector can thus grant or deny the handoff request from the terminal based on knowledge of the forward link loading for the BTSs.

3. BTS Initiated Forward Link Handoff

Forward link handoff may also be initiated by the BTSs based on reverse link transmissions from the terminals. The forward link handoff selection may be made based on measurements of the power or SNR of the reverse link pilots (or some other signals) received from the terminals by the BTSs.

Figure 3:
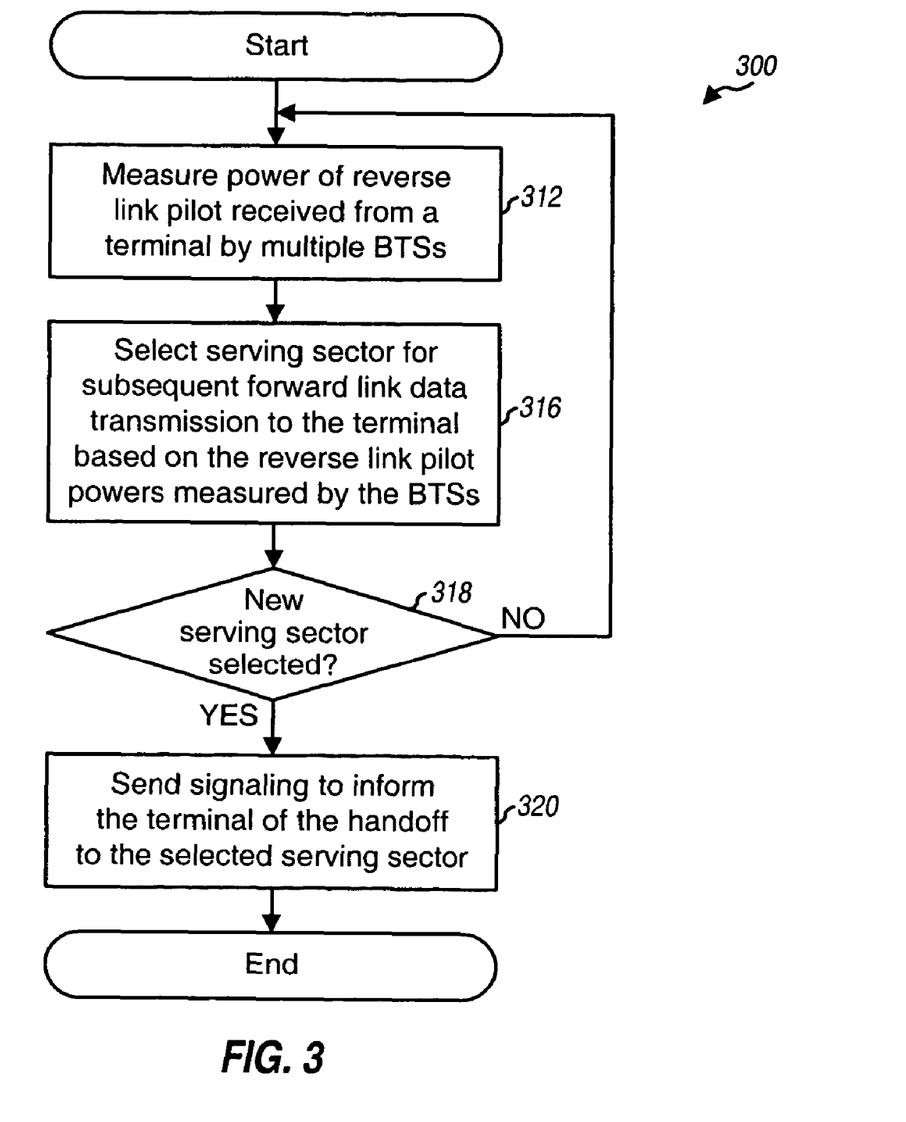
FIG. 3 is a flow diagram of an embodiment of a process for performing BTS-initiated forward link handoff.

FIG. 3 shows a flow diagram of an embodiment of a process 300 for performing BTS-initiated forward link handoff. Process 300 may be performed by the system.

Initially, multiple BTSs in the system measures the power of the reverse link pilot received from a terminal (step 312). For example, if the terminal transmit pilot on the CDMA reverse link, then each BTS can determine the average power of the pilot received from the terminal by despreading, decovering, and accumulating the reverse link pilot from the terminal using a CDMA pilot filter. The processing of the CDMA reverse link pilot is known in the art and not described in detail herein. The outputs of the pilot processing are measured pilot powers for the BTSs that receive the pilot from the terminal.

A serving sector is then selected for subsequent forward link data transmission to the terminal (step 316). The serving sector selection may be made with coordination among the BTSs that receive the reverse link pilot from the terminal. The BTSs can jointly determine which sector should serve the terminal on the OFDM forward link. The serving sector selection is made based on the pilot powers measured by the BTSs and a particular selection algorithm, which may be the same or different from the algorithm used by the terminal for the terminal-initiated forward link handoff. Again, hysteresis may be used to avoid ping-ponging between two serving sectors.

A determination is then made whether or not the newly selected serving sector for the terminal is the same as the current serving sector for the terminal (step 318). If the selected serving sector is the same as the current one, then the process returns to step 312. Otherwise, signaling may be sent to the terminal to inform it of the handoff to a new serving sector (step 320).

As noted above, the best choice for the serving sector for the terminal may not necessarily be the sector with the largest received reverse link pilot power for the terminal. For example, a sector with a lightly loaded forward link may be a better choice than a sector with a heavily loaded forward link, especially if the difference between the received powers measured by these sectors is small. The BTSs may thus consider loading and other relevant information when deciding to initiate a forward link handoff to change the terminal's serving sector.

4. Forward Link Handoff Performance

The terminal-initiated forward link handoff may provide better performance than the BTS-initiated forward link handoff. First, the terminal-initiated handoff may be more accurate since the serving sector selection is made based on measurements on the OFDM forward link. In contrast, the BTS-initiated handoff is made based on reverse link measurements and relies on correlation between the average forward link and reverse link channels. Second, the terminal-initiated handoff may be initiated faster than the BTS-initiated handoff. This is because the handoff determination is made by one terminal based on forward link measurements from multiple BTSs. In contrast, the handoff determination for the BTS-initiated handoff is made based on measurements at multiple BTSs from one terminal, and some processing and transmission delays are incurred.

The optimality of the serving sector selection in the terminal-initiated handoff is dependent on the accuracy of the power measurements for the received BTSs. The optimality of the serving sector selection in the BTS-initiated handoff is dependent on (1) the accuracy of the power measurements by the BTSs and (2) correlation or coherence between the OFDM forward link and CDMA reverse link. The extent of this forward/reverse link correlation is dependent on the amount of correlation between the reverse link and forward link fading processes. This fading correlation may be quite small if either (1) the forward and reverse links are transmitted on different frequency bands and the separation between the two frequency bands is large or (2) the wireless channel exhibits significant delay spread. However, the average behavior of the forward and reverse links should be similar (based on geographic considerations) even if these links experience uncorrelated fading when the coherence bandwidth (which is given as the inverse of the delay spread) is smaller than the separation between the two frequency bands.

Thus, a terminal may request a forward link handoff to change its serving sector based on measurements made by the terminal on OFDM pilots received on the forward link from multiple BTSs. The BTS of the serving sector may either grant or deny the handoff request based on the loading on the forward link for the sectors and other pertinent information available to the BTS. The data rate that may be used for the forward link data transmission to the terminal may be dependent on the quality of the wireless channel between the chosen serving sector and the terminal. The BTS-initiated forward link handoff may be used in conjunction with, or in place of, the terminal-initiated forward link handoff.

5. System

Figure 4:
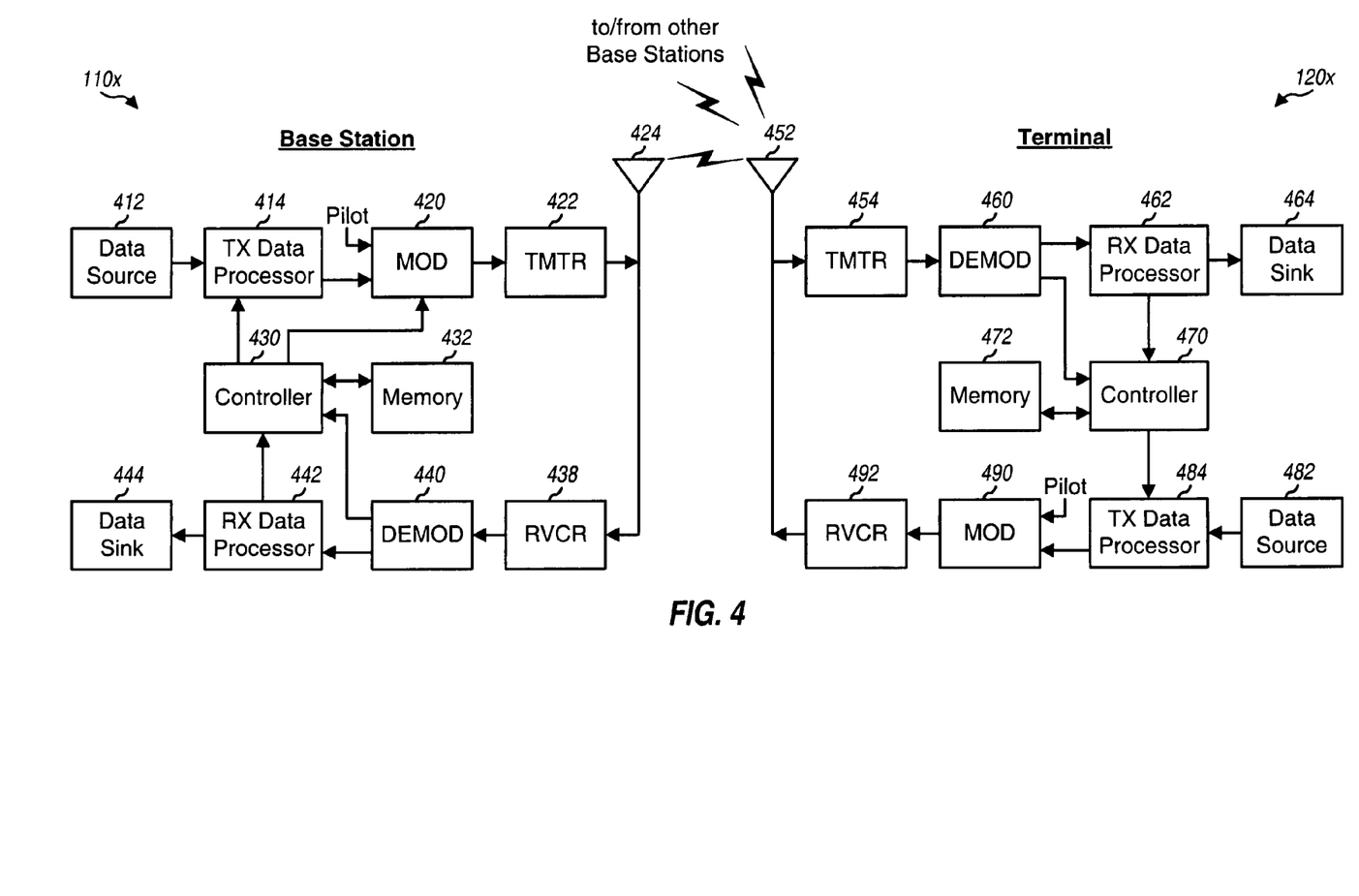
FIG. 4 is a block diagram of an embodiment of a base station and a terminal.

FIG. 4 shows a block diagram of an embodiment of a base station 110x and a terminal 120x in system 100. For simplicity, base station 110x performs processing for one sector.

On the forward link, at base station 110x, a transmit (TX) data processor 414 receives traffic data from a data source 412 and signaling and other data from a controller 430. TX data processor 414 formats, codes, interleaves, and modulates (i.e., symbol maps) the data to provide data modulation symbols, or simply data symbols. A modulator (MOD) 420 receives and multiplexes the data symbols with pilot symbols, performs the required processing, and provides a stream of OFDM symbols. The processing by modulator 420 is described in the aforementioned U.S. patent application Ser. No. 10/359,811. A transmitter unit (TMTR) 422 then processes the OFDM symbol stream to provide a forward link signal, which is then transmitted from an antenna 424 to the terminals.

At terminal 120x, the forward link signals transmitted by multiple base stations for multiple sectors are received by an antenna 452, and the received signal is processed (e.g., amplified, filtered, frequency downconverted, and digitized) by a receiver unit (RCVR) 454 to provide samples. A demodulator (DEMOD) 460 then processes the samples in a manner complementary to that performed by modulator 420 to provide measured pilot powers and data symbol estimates for the sector(s) being recovered. A receive (RX) data processor 462 further processes (e.g., symbol demaps, deinterleaves, and decodes) the data symbol estimates to provide decoded data, which may be provided to a data sink 464 for storage and/or a controller 470 for further processing.

The processing for the reverse link may be performed in accordance with the CDMA standard or design implemented for the reverse link. Data and signaling are processed (e.g., coded, interleaved, and modulated) by a TX data processor 484 to provide data symbols, which are multiplexed with pilot symbols and further processed by a modulator 490 to provide transmit symbols. A transmitter unit 492 further processes the transmit symbols to generate a reverse link signal, which is then transmitted from antenna 452.

At base station 110x, the reverse link signals from terminals are received by antenna 424, and the received signal is processed by a receiver unit 438 to provide samples. The samples are further processed by a demodulator 440 to provide data symbol estimates, which are further processed by an RX data processor 442 to provide decoded data for each terminal being recovered. The decoded data may be provided to a data sink 444 for storage and/or controller 430 for further processing.

Controllers 430 and 470 control the operation of various processing units at the base station and terminal, respectively. Memory units 432 and 472 store data and program codes used by controllers 430 and 470, respectively. Controller 470 may implement the process shown in FIG. 2 to determine whether or not to initiate a handoff request. If another sector is received better than the current serving sector, the controller 470 may provide a message for the handoff request to TX data processor 484 for transmission to the BTS for the current serving sector. Controller 430 for each BTS may participate in the process shown in FIG. 3 to determine whether or not to initiate a handoff of the terminal. The controllers for multiple BTSs may coordinate to perform the BTS-initiated forward link handoff for the terminal.

The forward link handoff techniques described herein may be implemented by various means. For example, these techniques may be implemented in hardware, software, or a combination thereof. For a hardware implementation, the elements used to support the forward link handoff at the BTS and the terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the forward link handoff techniques described herein may be implemented with modules (e.g., procedures, functions, and so on) that perform the functions described herein. The software codes may be stored in a memory unit (e.g., memory units 432 and 472 in FIG. 4) and executed by a processor (e.g., controllers 430 and 470). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing handoff on a forward link for a terminal, comprising:
   determining signal quality of pilots received by the terminal from a plurality of base stations in the system over the forward link, wherein the pilots are modulated using a multi-carrier modulation;
   identifying which of the base stations each of the pilots is received from based on scrambling codes assigned to respective one of the base stations for use in the multi-carrier modulation;
   selecting a particular base station of the base stations for subsequent data transmission on the forward link to the terminal based on a difference in the signal quality determined for the plurality of base stations; and
   initiating a request over the reverse link modulated using code division multiple access to hard handoff the forward link to the particular base station if different than a currently selected base station.

2. The method of claim 1, wherein the multi-carrier modulation is orthogonal frequency division multiplexing (OFDM).

3. The method of claim 1, wherein the signal quality relates to pilot power.

4. The method of claim 1, wherein the signal quality relates to signal-to-noise ratio (SNR).

5. The method of claim 1, wherein the selecting is performed using hysteresis to prevent ping-ponging between two base stations, wherein the hysteresis comprises a timer.

6. A method of performing a handoff on a forward link for a terminal with multi-carrier modulation (MCM) for the forward link, comprising:
   determining quality of a signal received from the terminal over a reverse link by a plurality of base stations in the system, wherein the signal is modulated using a code division multiple access;
   selecting a particular base station for subsequent data transmission on the forward link to the terminal based on a difference in the signal quality determined for the plurality of base stations, wherein optimality of the selecting depends on a correlation between a forward link fading process and a reverse link fading process; and initiating a hard handoff of the forward link for the terminal to the particular base station while continuing to receive reverse link data from the terminal using code division multiple access.

7. The method of claim 6, wherein the multi-carrier modulation is orthogonal frequency division multiplexing (OFDM).

8. The method of claim 6, wherein the signal quality relates to pilot power.

9. The method of claim 6, wherein another one of the at least one additional criterion relate to measurements for the signal received from the terminal by the plurality of base stations.

10. A terminal in a wireless communication system with multi-carrier modulation (MCM) for a forward link and code division multiple access (CDMA) for a reverse link, comprising:
   means for determining signal quality of pilot received by the terminal from a plurality of base stations in the system over the forward link, wherein the pilots are multiplexed using MCM;
   means for identifying which of the base stations each of the pilots is received from based on scrambling codes assigned to respective ones of the base stations for use in the MCM;
   means for selecting a particular base station of the base stations for subsequent data transmission on the forward link to the terminal based on a difference in the signal quality determined for the plurality of base stations; and
   means for initiating a request over the reverse link to hard handoff the forward link to the particular base station if different than a currently selected base station, wherein the request is modulated using CDMA.

11. An apparatus in a wireless communication system with multi-carrier modulation (MCM) for a forward link and code division multiple access (CDMA) for a reverse link, comprising:
   means for determining quality of a signal received over the reverse link from the terminal by a plurality of base stations in the system, wherein the signal is modulated using CDMA;
   means for selecting a particular base station for subsequent data transmission on the forward link to the terminal based on a difference in the signal quality determined for the plurality of base stations, wherein optimality of the means for selecting depends on a correlation between a forward link fading process and a reverse link fading process; and
   means for initiating a hard handoff of the forward link for the terminal to the particular base station while continuing to receive reverse link data from the terminal using CDMA.

12. The method of claim 1, wherein the selecting is further based on at least one other criteria comprising a priority of the terminal.

13. The method of claim 1, wherein the selecting is further based on at least one other criteria comprising a service currently obtained by the terminal.

14. The method of claim 6, wherein the selecting is further based on at least on other criteria comprising a priority of the terminal.

15. The method of claim 6, wherein the selecting is further based on at least one criteria comprising a service currently obtained by the terminal.

16. The method of claim 6, wherein the selecting is performed using hysteresis to prevent ping-ponging between two base stations, wherein the hysteresis comprises a timer.

17. The terminal of claim 10, wherein the means for selecting selects further based on at least one other criteria comprising a priority of the terminal.

18. The terminal of claim 10, wherein the means for selecting selects further based on at least one other criteria comprising a service currently obtained by the terminal.

19. The method of claim 10, wherein the means for selecting selects further based on hysteresis to prevent ping-ponging between two base stations, wherein the hysteresis comprises a timer.

20. The apparatus of claim 11, wherein the means for selecting selects further based on at least one other criteria comprising a priority of the terminal.

21. The apparatus of claim 11, wherein the means for selecting selects further based on at least one other criteria comprising a service currently obtained by the terminal.

22. The apparatus of claim 11, wherein the means for selecting selects further based on hysteresis to prevent ping-ponging between two base stations, wherein the hysteresis comprises a timer.

23. A computer-program product for performing handoff on a forward link for a terminal in a wireless communication system with multi-carrier modulation (MCM) for the forward link and code division multiple access (CDMA) for a reverse link, comprising:
   a non-transitory computer-readable medium comprising instructions executable to:
      determine signal quality of pilots received by the terminal over the forward link from a plurality of base stations in the system, wherein the pilots are modulated using MCM;
      identify which of the base stations each of the pilots is received from based on scrambling codes assigned to respective one of the base stations for use in the MCM;
      select a particular base station of the base stations for subsequent data transmission on the forward link to the terminal based on a difference in the signal quality determined for the plurality of base stations; and
      initiate a request over the reverse link to hard handoff the forward link to the particular base station if different than a currently selected base station, wherein the request is modulated using CDMA.

24. The computer-program product of claim 23, wherein the instructions executable to select utilize hysteresis to prevent ping-ponging between two base stations, wherein the hysteresis comprises a timer.

25. A computer-program product for performing handoff on a forward link for a terminal in a wireless communication system with multi-carrier modulation (MCM) for the forward link and code division multiple access (CDMA) for a reverse link wireless communications, comprising:
   a non-transitory computer-readable medium comprising instructions executable to:
      determine quality of signal received from the terminal over the reverse link by a plurality of base stations in the system, wherein the signal is modulated using CDMA;
      select a particular base station for subsequent data transmission on the forward link to the terminal based on a difference in the signal quality determined for the plurality of base stations, wherein optimality of selecting depends on a correlation between a forward link fading process and a reverse link fading process;
      initiate, at one of the plurality of base stations, a hard handoff of the forward link for the terminal to the particular base station while continuing to receive reverse link data from the terminal; and transmit a signal informing of the handoff to the terminal over the forward link, wherein the signal is modulated using MCM.

26. The computer-program product of claim 25, wherein the instructions executable to select utilize hysteresis to prevent ping-ponging between two base stations, wherein the hysteresis comprises a timer.

27. An apparatus for performing handoff on a forward link for a terminal, comprising:
an antenna;
a processing system coupled to the antenna and configured to:
determine signal quality of pilots received by the terminal over the forward link from a plurality of base stations in the system, wherein the pilots are modulated using multi-carrier modulation;
identify which of the base stations each of the pilots is received from based on scrambling codes assigned to respective one of the base stations for use in the MCM;
select a particular base station of the base stations for subsequent data transmission on the forward link to the terminal based on a difference in the signal quality determined for the plurality of base stations; and
initiate a request over the reverse link to hard handoff the forward link to the particular base station if different than a currently selected base station, wherein the request is modulated using code division multiple access.

28. The computer-program product of claim 27, wherein the processing system selects at least in part by using hysteresis to prevent ping-ponging between two base stations, wherein the hysteresis comprises a timer.

29. An apparatus for performing handoff on the forward link for a terminal, comprising:
an antenna;
a processing system coupled to the antenna and configured to:
determine quality of a signal received from the terminal over a reverse link by a plurality of base stations in the system, wherein the signal is modulated using code division multiple access;
select a particular base station for subsequent data transmission on the forward link to the terminal based on a difference in the signal quality determined for the plurality of base stations, wherein optimality of selecting depends on a correlation between a forward link fading process and a reverse link fading process;
initiate, at one of the plurality of base stations, a hard handoff of the forward link for the terminal to the particular base station while continuing to receive a reverse link signal from the terminal; and
transmit a forward link signal to the terminal informing of the handoff, wherein the forward link signal is modulated using a multi-carrier modulation.

30. The apparatus of claim 29, wherein the processing system selects at least in part by using hysteresis to prevent ping-ponging between two base stations, wherein the hysteresis comprises a timer.

* * * * *